US006631611B2

(12) United States Patent
Shi et al.

(10) Patent No.: US 6,631,611 B2
(45) Date of Patent: Oct. 14, 2003

(54) METHODOLOGY OF ROBUST INITIALIZATION OF CATALYST FOR CONSISTENT OXYGEN STORAGE CAPACITY MEASUREMENT

(75) Inventors: Guojun Shi, Wixom, MI (US); Sharanjit Singh, Farmington Hills, MI (US); Minghui Kao, Rochester Hills, MI (US); David W. Dempsey, Highland, MI (US)

(73) Assignee: General Motors Corporation, Detroit, MI (US)

( * ) Notice: Subject to any disclaimer, the term of this patent is extended or adjusted under 35 U.S.C. 154(b) by 168 days.

(21) Appl. No.: 09/867,977

(22) Filed: May 30, 2001

(65) Prior Publication Data

US 2002/0178714 A1 Dec. 5, 2002

(51) Int. Cl.$^7$ ................................................. F01N 3/00
(52) U.S. Cl. ........................... 60/285; 60/274; 60/276; 60/284; 123/691; 701/103; 701/109
(58) Field of Search .......................... 60/274, 276, 277, 60/285, 284; 123/691; 701/103, 105, 109, 114

(56) References Cited

U.S. PATENT DOCUMENTS

| 5,159,810 A | * | 11/1992 | Grutter et al. ................. 60/274 |
| 5,237,818 A | | 8/1993 | Ishii et al. ...................... 60/274 |
| 5,255,511 A | | 10/1993 | Maus et al. .................... 60/274 |
| 5,289,678 A | * | 3/1994 | Grutter ........................... 60/277 |
| 5,307,626 A | | 5/1994 | Maus et al. .................... 60/274 |
| 5,339,628 A | | 8/1994 | Maus et al. .................... 60/277 |
| 5,355,671 A | | 10/1994 | Maus et al. .................... 60/274 |
| 5,357,791 A | | 10/1994 | Gee et al. ..................... 73/118.1 |
| 5,426,934 A | | 6/1995 | Hunt et al. ..................... 60/276 |
| 5,431,011 A | | 7/1995 | Casarella et al. .............. 60/274 |
| 5,431,042 A | | 7/1995 | Lambert et al. ............... 73/116 |
| 5,490,064 A | | 2/1996 | Minowa et al. ........... 364/424.01 |
| 5,505,837 A | | 4/1996 | Friese et al. .................. 204/425 |
| 5,602,737 A | * | 2/1997 | Sindano et al. ................ 60/276 |
| 5,630,315 A | | 5/1997 | Theis ............................ 60/274 |
| 5,706,652 A | | 1/1998 | Sultan ........................... 60/274 |
| 5,724,808 A | * | 3/1998 | Ito et al. ........................ 60/276 |
| 5,842,339 A | * | 12/1998 | Bush et al. .................... 60/274 |
| 5,941,918 A | | 8/1999 | Blosser ......................... 701/29 |
| 6,116,021 A | * | 9/2000 | Schumacher et al. ......... 60/274 |

OTHER PUBLICATIONS

Catalytic Converter Diagnosis Using the Catalyst Exotherm, Joseph R. Theis, AC Delco Systems Div. of GMC; SAE No. 942058; Fuels & Lubricants Meeting & Exposition Baltimore, MD; Oct. 17–20, 1994.

(List continued on next page.)

Primary Examiner—Thomas Denion
Assistant Examiner—Binh Tran
(74) Attorney, Agent, or Firm—Christopher DeVries

(57) ABSTRACT

A method of initializing the catalyst converter for monitoring the conversion efficiencies of a catalytic converter by measuring the oxygen storage capacity (OSC) of the converter. The measurement of the OSC indicates the degree of health of the converter. Under the same engine running conditions, the greater the OSC measurement, the healthier the converter. The catalyst needs to be set to either a rich state or a lean state prior to the measurement of its OSC time. This process is called catalyst state initialization. The catalyst has to be fully saturated from test to test in order to make consistent OSC measurements. This is through open loop fuel control by commanding a lean air to fuel ratio and then monitoring thepost-O2 sensor voltage until it falls below a calibrated value (e.g. 80 mV) indicating a lean state. The system continues to command a lean air to fuel ratio (e.g. 6%) for a calibrated duration of time (e.g. 3 seconds) to saturate the catalytic converter and drive it to a fixed saturation state. This ensures consistent OSC measurement in the second stage of the test.

16 Claims, 6 Drawing Sheets

OTHER PUBLICATIONS

Calculating the Rate of Exothermic Energy Release For Catalytic Converter Efficiency Monitoring; Joseph S. Hepburn and Allen H. Maitzler, Ford Motor Company; SAE No. 952423 Fuels and Lubricants Meeting and Exposition; Toronto, Ontario; Oct. 16–19, 1995.

Alternative Technologies for Studying Catalyst Behaviour To Meet OBD II Requirements; Stephen Pelters, Dietmar Schwarzenthal (Porche AG); Wolfgang Maus, Helmut Swars and Rolf Bruck (Emitec GmbH); SAE No. 932854; Fuels & Lubricants Meeting & Exposition; Philadelphia, PA; Oct. 18–21, 1993.

A Catalytic Oxidation Sensor for the on Board Detection of Misfire and Catalyst Efficiency: Wei Cai & Nick Collings; University of Cambridge; No. 922248; pp. 51–62.

* cited by examiner

METHODOLOGY OF ROBUST INITIALIZATION OF CATALYST FOR CONSISTENT OXYGEN STORAGE CAPACITY MEASUREMENT

CROSS REFERENCE TO RELATED APPLICATIONS

This application is related to commonly owned and assigned U.S. patent application Ser. No. 09/794,607, filed on Feb. 27, 2001, the contents of which are incorporated herein by reference thereto.

FIELD OF THE INVENTION

This invention relates generally to an onboard system for monitoring vehicular emissions and more particularly to a diagnostic system for monitoring such emissions.

BACKGROUND

Government regulations require vehicles equipped with internal combustion engines to have emission monitoring systems conventionally known as OBD (On-Board Diagnostic Systems) to advise the operator of the vehicle when the gaseous pollutants or emissions produced by such vehicles exceed government regulatory standards. Government regulatory standards set emission threshold levels which the vehicle cannot exceed when operated pursuant to a specified driving cycle such as that set forth in a FTP (Federal Test Procedure). The FTP requires the vehicle be operated at various acceleration/deceleration modes as well as at steady state or constant velocity at various specified speeds.

One of the principal components of the vehicle's emission system is the catalytic converter, typically a TWC (Three Way Catalyst—$NO_x$, hydrocarbons and oxides, i.e., CO). TWCs store oxygen when the engine operates lean and release stored oxygen when the engine operates rich to combust gaseous pollutants such as hydrocarbons or carbon monoxide. As the catalyst ages, its ability to store oxygen diminishes and thus the efficiency of the catalytic converter decreases.

In order to determine the efficiency of the catalytic converter, systems monitor the ability of TWCs to store oxygen to determine failure of the catalyst. Typically an EGO (exhaust gas oxygen sensor) is placed upstream of the TWC and an oxygen sensor is placed either within or downstream of the TWC to sense the oxygen content in the exhaust gas. The signals are adjusted for the time it takes the exhaust gas to travel from the precatalytic converter sensor to the postcatalytic converter oxygen sensor. The adjusted signals are then compared to ascertain the storage capacity of the TWC when the engine is in a lean or stoichiometric mode.

The principal disadvanatage of this method is simply that the oxygen storage capacity of the TWC has been demonstrated to poorly correlate with hydrocarbon conversion efficiencies. See J. S. Hepburn and H. S. Gandhi "The Relationship Between Catalyst Hydrocarbon Conversion Efficiency and Oxygen Storage Capacity", SAE paper 920831, 1992 and G. B. Fischer, J. R. Theis, M. V. Casarella and S. T. Mahan "The Roll of Ceria in Automotive Exhaust Catalysis and OBD-II Catalyst Monitoring", SAE paper 931034, 1993. Another significant disadvantage of current monitoring systems is that for such methods to be applied to low emission vehicles and ultra-low emission vehicles, it will be necessary to monitor increasingly smaller portions of the TWC leading to less reliable correlations to total TWC performance. Finally, any system which attempts to evaluate the efficiency of the catalytic converter by ascertaining the gas composition of an exhaust stream before and after the TWC is inherently flawed because i) the speed of the gas has to be precisely determined even though the gas stream passes through a tortuous path within the converter conducive to producing uneven flow for various gas stream slips and ii) the gaseous reactions within the TWC are fundamentally kinetic in nature and vary in a complex manner depending on the speed and particular composition of the exhaust gas at any given instant.

Vehicles are equipped with engine microprocessors or ECMs (engine control modules) that are sophisticated, high powered devices capable of processing input from any number of sensors depicting operating conditions of the vehicle and rapidly issuing engine control signals in response thereto. An ECM can be programmed to perform on-board monitoring of the emissions system. U.S. Pat. No. 5,490,064 to Minowa illustrates such a control unit which includes in its functions an on-board self diagnostic emissions monitoring process using conventional pre and post-catalytic O2 sensors, digital filtering and exhaust gas speed to correlate the sensor readings to one another to determine failure of the catalytic converter. U.S. Pat. No. 5,431,011 to Casarella et al. likewise illustrates precatalytic and postcatalytic converter O2 sensors whose signals are processed by the CPU in the ECM along with other vehicle operational signals. In Casarella, a two-stage analyzing technique is utilized. Filtered signals are collected in a first stage and analyzed. If the first stage analysis indicates a failure, then a more thorough or rigorous second stage scrutiny of a number of signals which can affect performance of the catalytic converter is conducted before indicating failure of the converter. Despite the sophistication employed in the computer program and the ECM, the aforementioned system is inherently flawed because of the defects in the sampling system discussed above.

Catalysts are commonly used as part of exhaust systems to treat motor vehicle exhaust in order to minimize air pollution. The reduction of pollution from motor vehicles is mandated by the Environmental Protection Agency through the Environmental Protection Act. As part of the process to assure compliance, it is common for various motor vehicle regulatory bodies to mandate tailpipe testing of automobiles on a regular basis. In order to avoid the expense of such emissions, inspection and to assure that automobiles on the road are complying with the environmental laws and regulations, there are efforts to develop a system which can sense when the exhaust system is not compliant and signal the vehicle operator accordingly.

It is the goal to monitor the exhaust gas of a motor vehicle during normal operation to determine whether the catalytic converter is performing as required. The apparatus and method to accomplish this is commonly referred to as onboard diagnostics (OBD). The strategy which is contemplated is that the performance of the catalyst is determined based on sensing the exhaust gases to determine whether the catalyst is performing as specified and required. Different sensing means have been proposed but all are required to signal the motor vehicle operator if the catalyst is failing to operate as required.

Sensors useful to measure various components in gaseous exhaust streams such as motor vehicle exhaust streams are known. Useful sensors include oxygen sensors and NOx sensor assemblies. Such oxygen sensors include on/off sensors known as heated exhaust gas oxygen sensors (HEGO)

and universal exhaust gas oxygen sensors (UEGO) which is an on/off sensor plus a linear signal which is a function of the air to fuel ratio. Various oxygen sensors have been used and are disclosed in the art including the above referenced sensors.

Other approaches to sense whether the catalyst is performing include the use of dual oxygen sensors. In accordance with this method, one oxygen sensor is located upstream of the catalyst and the other downstream of the catalyst. The signals from the upstream and downstream sensors are compared and correlated to the emissions, typically hydrocarbon emissions, to determine whether the catalyst is functioning to reduce hydrocarbon emissions to achieve compliance with the regulations. If the amount of emissions is calculated to exceed a specific amount, a signal can be sent to the motor vehicle console to alert the operator that the system to treat exhaust has failed and repair is required.

The use of a dual oxygen sensor system has been reported in SAE Technical Paper Series No. 900062, Clemmens, et al., "Detection of Catalyst Performance Loss Using On-Board Diagnostics" presented at the International Congress and Exposition, Detroit, Mich., Feb. 26-Mar. 2, 1990. This paper reviews the history of such systems which are commonly referred to as On-Board Diagnostic Systems (OBD). This early study was indicated to be a proof of concept testing study to identify serious losses in catalyst efficiency with a dual oxygen sensor method. In accordance with this disclosure, testing was conducted at steady state conditions. The results showed that this approach resulted in measurable differences in the pre- and post-oxygen sensor signals between catalyst with good and poor conversion efficiencies.

SAE Technical Paper Series No. 910561, Koupal, et al., "Detection of Catalyst Failure On-Vehicle Using the Dual Oxygen Sensor Method" was presented at the International Congress and Exposition, Detroit, Mich., Feb. 25–Mar. 1, 1991. This paper presents the results of a test program that used a dual oxygen sensor coupled with a simulated On-Board Diagnostic Algorithm to attempt detection of seriously deteriorated catalytic converters on a test vehicle operated over the Federal Test Procedure (FTP). Previous work is reviewed which relates to determining the methodologies to detect catalyst failure by observing the effects of three-way catalyst (TWC) conversion activity on a response pattern generated between an oxygen sensor place upstream and oxygen sensor place downstream of the catalyst. One analytical method is referred to which quantified the fluctuation and sensor response by calculating the area underneath the sensor curves for a discrete time period, then taking the difference in sensor wave form area values. This integrated area difference method has been reported in the above reference to Clemmens. The background further references a study in 1980 by A. H. Meitzler, "Application of Exhaust-Gas-Oxygen Sensors to the Study of Storage Effects in Automotive Three-Way Catalyst", SAE Technical Series No. 800019 which used the response delay of a downstream oxygen sensor to an instantaneous air/fuel shift as an indicator of a catalyst oxygen storage mechanism. Koupal studied the adaption of the integrated area difference algorithm developed by Clemmens to on-vehicle test results. The results were that the dual oxygen sensor method using integrated area difference analysis, was able to distinguish between good and bad catalyst under controlled conditions.

Presently, the method disclosed in this SAE Technical Paper Series 910561 is a method of using dual oxygen sensors for on-board diagnostic system measurement. However, it is extremely difficult to obtain consistent in-field measurements due to inconsistencies and, often, insufficient air to fuel swings.

One method to determine whether the catalyst is performing is to measure the switch ratio of the downstream versus the upstream EGO sensors to determine the oxygen storage capacity of a catalytic converter. Based on this measurement the performance can be assessed (J. W. Koupal, M. A. Sabourin, W. B. Clemmens, "Detection of Catalyst Failure On-Vehicle Using the Dual Oxygen Sensor Method", SAE 910561, 1991). Currently, this is the most common method of using dual oxygen sensors for on-board diagnostic system measurements. However, it is extremely difficult to obtain consistent in-field measurements due to inconsistent and often insufficient air to fuel swings.

Another method of using dual oxygen sensors includes biasing the engine air to fuel ratio either rich or lean, and then determining the time it takes for the downstream HEGO sensor to sensor switch in the engine operating condition, vis-a-vis the upstream HEGO sensor. While this is a more reliable method of determining the oxygen storage capacity of the catalytic converter, it is intrusive. The measurement procedure involves changing the operation condition of the vehicle.

There are two inherent problems relating to the use of the oxygen sensors for on-board diagnostic measurements. One, is that there is no strong relationship between the oxygen storage in the catalytic converter and the hydrocarbon conversion performance of the catalytic converter. Secondly, it is difficult to determine a mode of operation of the vehicle under which reliable, meaningful comparisons can be made between the two sensors. It is therefore a continuing goal to devise an algorithm in combination with a sensor strategy to diagnose working of the catalytic converter.

SUMMARY OF THE INVENTION

An on-board catalyst diagnostic for monitoring the conversion efficiencies by measuring oxygen storage capacity (OSC) of the converter.

Using the OSC as a signature to monitor the catalyst conversion efficiency by directly monitoring the OSC of the catalyst, not the emissions. The accuracy of the monitoring system is improved by having a good mathematical model for OSC.

The system uses actual emission data stored and sampled in appropriate histograms and determines the vehicle's potential for meeting regulatory emission standards by comparing measurements to a threshold value. The emission data is determined from the development process.

This is achieved in an on-board vehicular catalytic converter monitoring system (method and/or apparatus) for monitoring the Oxygen Storage Capacity of the catalyst converter's and generating signals during vehicle operation.

The vehicle's electronic control module simultaneously processes the signals to determine when and if the signals have exceeded regulatory standards.

Accordingly, the system provides a vehicle on-board emissions monitoring system which utilizes actual emission data produced by the specific monitored vehicle (threshold value) to construct relatively large data bases coinciding with government mandated FTPs which can be statistically validated to insure accurate and reliable compliance with vehicular emission standards.

The system provides an accurate vehicular on-board automotive emission monitoring system which produces consistent, reliable readings indicative of the gaseous pollutants actually emitted by the vehicle.

The system also provides an automotive on-board emission monitoring system which can be varied to determine compliance with any emission test protocol and which can automatically adjust for aging of the catalytic converter.

The system provides an on-board vehicular emission monitoring system which is simple and inexpensive.

In an embodiment, the system provides a vehicular emission monitoring system which utilizes the vehicle's existing ECM to monitor the emissions produced by the vehicle.

Still another object of an exemplary embodiment of the present invention is to provide an on-board vehicular emission monitoring system which is predictive of an expected failure of the vehicle's emission system so that the vehicle can be scheduled for preventive maintenance.

Still another object of an exemplary embodiment of the present invention is to provide an on-board emission d iagnostics system which after determining that a failure of the emissions system by a relatively fast processing routine then proceeds to execute further processing routine to pinpoint the components in the system which caused the failure.

These and other objects, features and advantages of the present invention will become apparent to those skilled in the art upon reading and understanding the Detailed Description of the Invention set forth below taken in conjunction with the drawings.

BRIEF DESCRIPTION OF THE DRAWINGS

Other objects, features, advantages and details of the present invention appear, by way of example only, in the following detailed description of preferred embodiments of the invention, the detailed description referring to the drawings in which.

DESCRIPTION OF THE PREFERRED EMBODIMENTS

The invention is particularly relevant to an emissions monitoring system in compliance with government regulatory emissions standards such as OBD II mandated by the State of California. However, those skilled in the art will recognize that the invention may have broader applications and could be used for monitoring, evaluating and/or predicting the functional operation of any number of vehicle components whether or not related to the vehicle's emissions.

The present invention is related to U.S. Pat. Nos. 5,941,918, 5,431,042, 5,426,934, 5,490,064, 5,237,818 and 5,505,837 the contents of which are incorporated herein by reference thereto.

Figure 1:
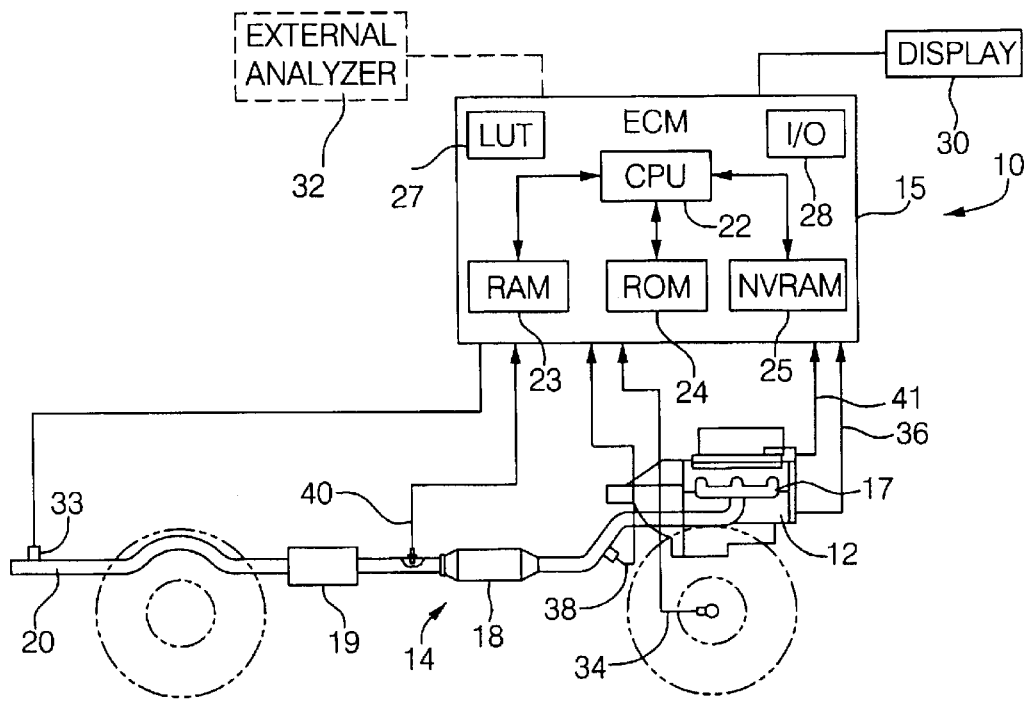
FIG. 1 is a general diagrammatic illustration of the vehicular components of an emission system.
Figure 2:
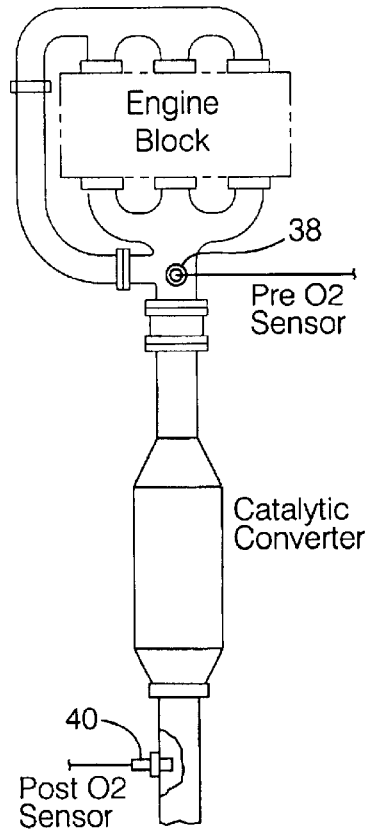
FIG. 2 is a general diagrammatic illustration of portions of a vehicle emission system.
Figure 3:
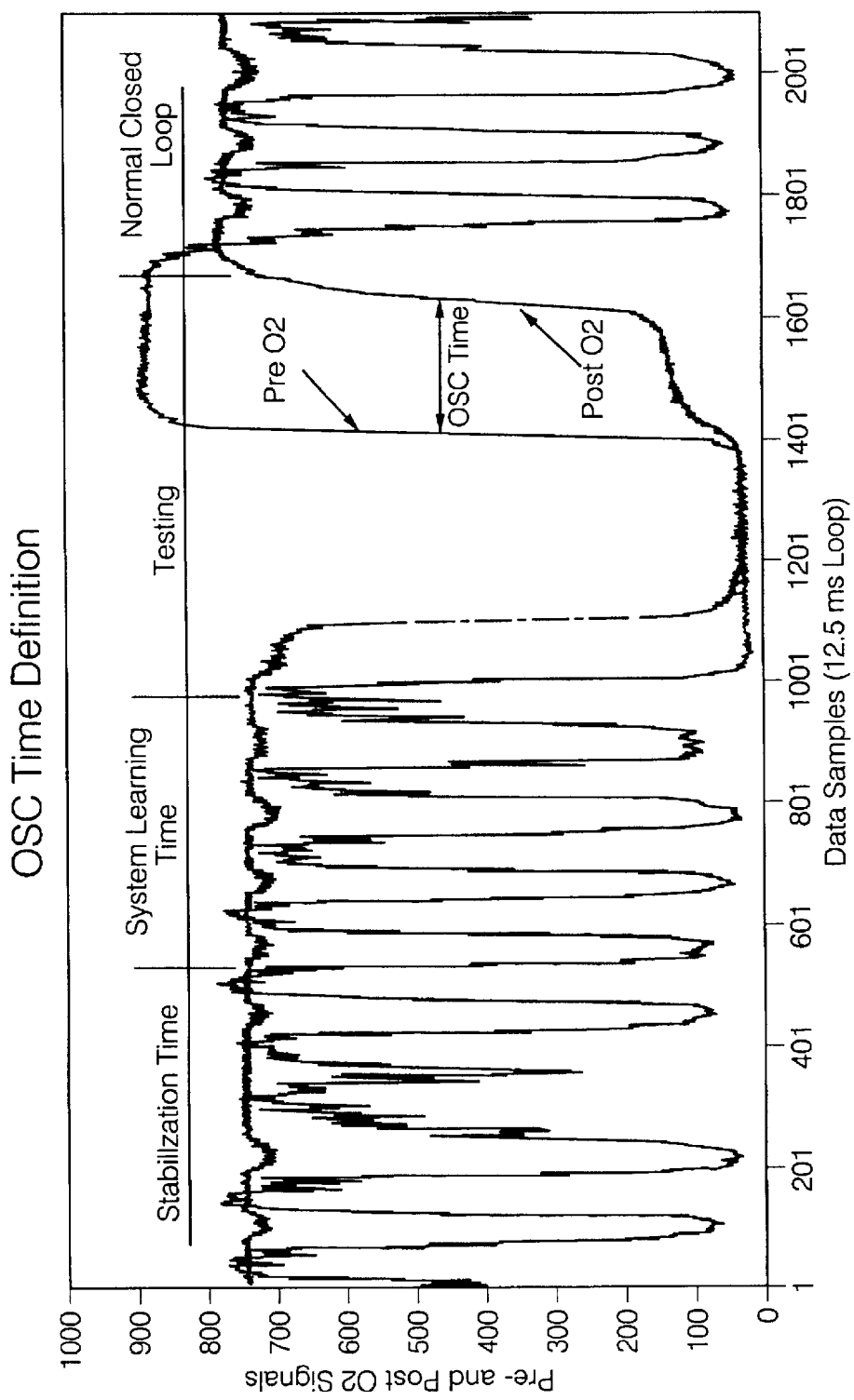
FIG. 3 is a graph illustrating pre and post O2 signals for OSC time definition.

Referring now to the drawings wherein the showings are for the purpose of illustrating a preferred embodiment invention only and not for the purpose of limiting same, there is generally shown in diagrammatic form in FIG. 1 the principal components of a vehicular emission control system 10. The vehicle has an internal combustion engine 12 which discharges gaseous pollutants or emissions through an exhaust system 14. Internal combustion engine 12 is conventionally under the control of an electronic control module or ECM 15 (controller or computer).

Exhaust system 14 is conventional and includes an exhaust header 17, a three-way catalyst or TWC 18 positioned downstream of exhaust header 17, a muffler 19 downstream of TWC 18 and a tailpipe 20 downstream of muffler 19 which is open to atmosphere for discharging or emitting the emissions or gaseous pollutants produced by internal combustion engine 12.

ECM 15 is conventional and includes well known elements such as a central processing unit or CPU 22, RAM (Random Access Memory) 23, ROM (Read Only Memory) 24, and NVRAM (Non Volatile Random Access Memory) 25. Also included is a look-up table 27 separate and apart from ROM 24 (or alternatively included as a component of ROM 24). Also shown is a conventional input/output unit (I/O) unit 28 for receiving and transmitting appropriate instructions from and to ECM 15. Insofar as the present invention is concerned, I/O unit 28 will transmit appropriate instructions to activate a display failure light 30 situated in the vehicle. I/O unit 28 may also interface with an external analyzer 32 which could be optionally supplied if analog circuitry were optionally provided to process the emission signals.

Communication between ECM 15 and actuation units on the vehicle including sensors associated therewith is typically carried out via conventional two-way communication links which may be, for example, bi-directional serial data links in 8-bit, 16-bit or 24-bit formats. ECM 15 operates in a well established known manner to control the engine and process engine control and diagnostic routines, such as stored by step by step instructions in ROM 24. Essentially, engine operating parameters are read into ECM as input signals which are then processed into output signals or control signals outputted from ECM to actuation units on the vehicle controlling the vehicular operation, specifically, the operation of internal combustion engine 12. Insofar as the present invention is concerned, input sensor signals are read into ECM, processed by RAM 23 and NVRAM 25 under the control of CPU 22 from algorithm routines stored in ROM 24. Processed data is stored in memory (multi-channel analyzers within ROM 24 and data in LUT 27) which is then accessed by RAM 23 and NVRAM 25 through algorithms stored in ROM under the control of CPU 22 to generate signals outputted by I/O unit 28 to display 30.

Several sensors normally applied to the vehicle with their sensor signals inputted to ECM 15 are shown in FIG. 1. Typical sensors which generate operative signals indicative of an operating condition of the vehicle include a vehicle speed sensor generating vehicle speed signals on line 34; an RPM sensor generating signals on line 36 indicative of the RPMs of engine 12; an EGO sensor generating signals on line 38 indicative of the oxygen present in the exhaust gas upstream of TWC 18 for controlling the exhaust gas recirculation (EGR) system on the vehicle; and an EGO sensor generating signals on line 40 indicative of the oxygen present in the exhaust gas down stream of TWC 18 and a "miscellaneous" sensor generating signals on line 41 indicative of any other sensor signals used to control ignition timing, fuel injection, etc. of engine 12.

California Air Resources Board released new OBD II regulations on May 26, 1999 (CARB mail-out 99-12)

greatly tightening vehicle pipeline emissions. The new emission standards are referred to as LEVII standards. The regulations require OBDII systems monitor emission-related components on-line based on the LEVII standards, which creates great challenges to the automotive industry.

In accordance with these requirements a catalyst system shall be considered malfunctioning when its conversion capability decreases to the point that hydrocarbon (HC) or oxides of nitrogen (NOx) emissions exceed 1.75 times the applicable FTP emission standards. Since the LEV II standards are much more stringent than the current ULEV standards in terms of the NOx emissions (e.g., the Anno exhibition standards for MDV trucks is reduced by the factor of 12 from ULEV to LEVII), a catalyst monitor with higher accuracy and robustness must be developed to comply with the new requirements.

The catalytic converter contains reactive precious metals to convert the unburned hydrocarbon (HC), carbon monoxide (CO) and oxides of nitrogen (NOx) which result from the combustion of gasoline. When the catalyst is working properly, the unburned hydrocarbon and carbon monoxide components are oxidized by combining with oxygen. This oxidation forms water vapor and carbon dioxide (CO2). The oxides of nitrogen are reduced to nitrogen and oxygen, greatly reducing their negative environmental effects. The on-board catalyst diagnostic monitors the conversion efficiencies by measuring the oxygen storage capacity (OSC) of the converter. The measurement (OSC) indicates the degree of health of the converter. Under the same engine running conditions, the greater the OSC measurement, the healthier the converter.

The following describes the six stages of a test for catalyst monitor in accordance with an exemplary embodiment of the present invention.

Stabilization Time

After the vehicle has been started and enters an idle state, the whole system takes a few seconds (e.g. 4 seconds) to stabilize and finish the transition from driving to idling.

System Learning Time

This is a closed-loop fuel control state where fuel control data, idle stability data, and catalyst operating state data is captured prior to enabling the first of the two air/fuel transitions. At the end of this stage, the proportional fuel control should be set to zero, the long-term memory should be frozen at where it is, and the short term integrator should be frozen to the average value during the stage. The fuel control system enters an open-loop mode afterwards until the whole diagnostic is finished or aborted.

Testing with the First Air/Fuel Ratio Transition

The first of the two air/fuel transitions is performed by changing the commanded air/fuel ratio from the stoichiometric point to a lean value. In an exemplary embodiment, the percentage air/fuel ratio change is a calibration constant (e.g. 6% lean).

Robust Initialization of the Catalyst State

The catalyst needs to be set to either a rich state or a lean state proper to the measurement of its OSC time. This process is called catalyst state initialization. The catalyst has to be fully saturated from test to test in order to make consistent OSC measurements. This is through open loop fuel control by commanding a lean air to fuel ratio and then monitoring the post-O2 sensor voltage until it falls below a calibrated value (e.g. 80 mV) indicating a lean state.

The system continues to command a lean air to fuel ratio (e.g. 6%) for a calibrated duration of time (e.g. 3 seconds) to saturate the catalytic converter and drive it to a fixed saturation state. This ensures consistent OSC measurement in the second stage of the test.

Development data has shown that robust initialization is significant in making consistent OSC measurements. The OSC model developed in U.S. patent application Ser. No. 09/794,607, attorney docket No. GP-300300 assists in the processing of OSC data and making an accurate determination of the converters health.

Testing with the Second Air/Fuel Ratio Transition

The second of the two air/fuel transitions is performed by changing the commanded air/fuel ratio to the direction opposite to the previous stage. The OSC measurement is made during this transition. The OSC is the measured elapsed time between the transition of pre-O2 sensor to the second air/fuel state and the transition of the post O2 sensor to the second air/fuel state.

In the second part of the test a rich air to fuel ratio (e.g. 10%) is commanded in open loop and the time delay between the pre_$O_2$ switch and post_O2 switch is measured. The measured time delay is called the OSC time.

End of Test

A return to closed-loop fuel control at the end of the test.

Figure 4A:
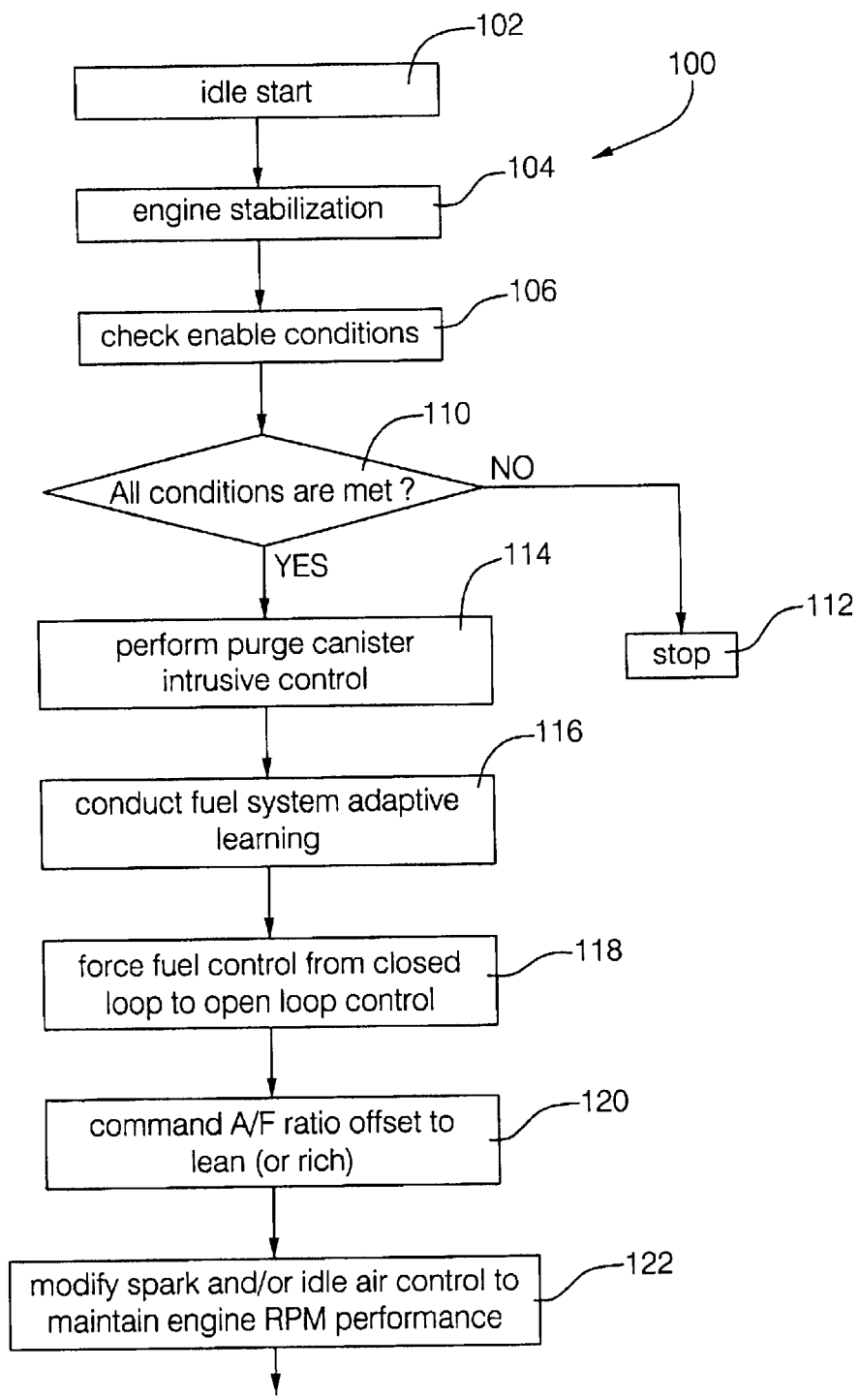
FIGS. 4A–4C illustrate a process flow chart of the monitoring system of an exemplary embodiment of the present invention.
Figure 4B:
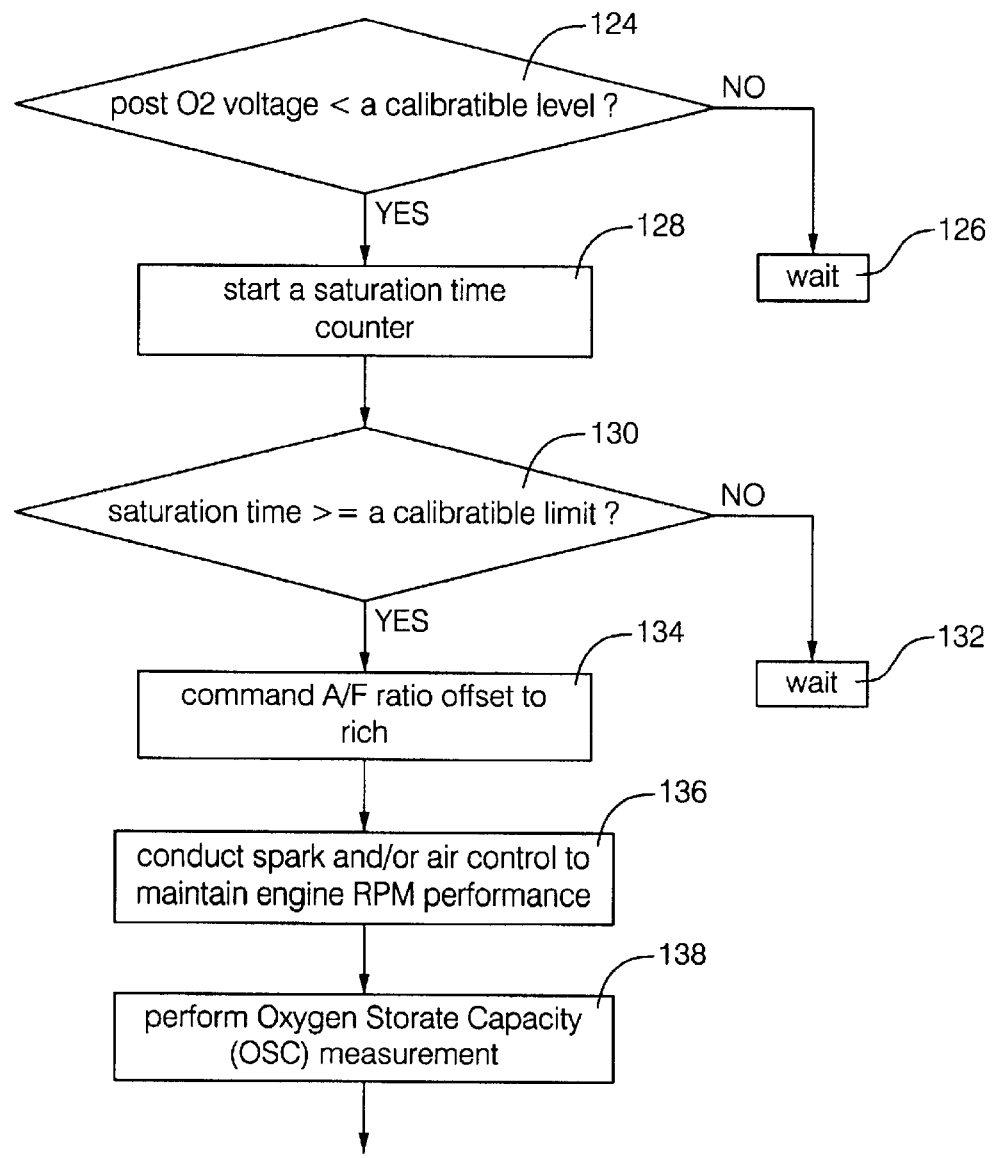
Figure 4C:
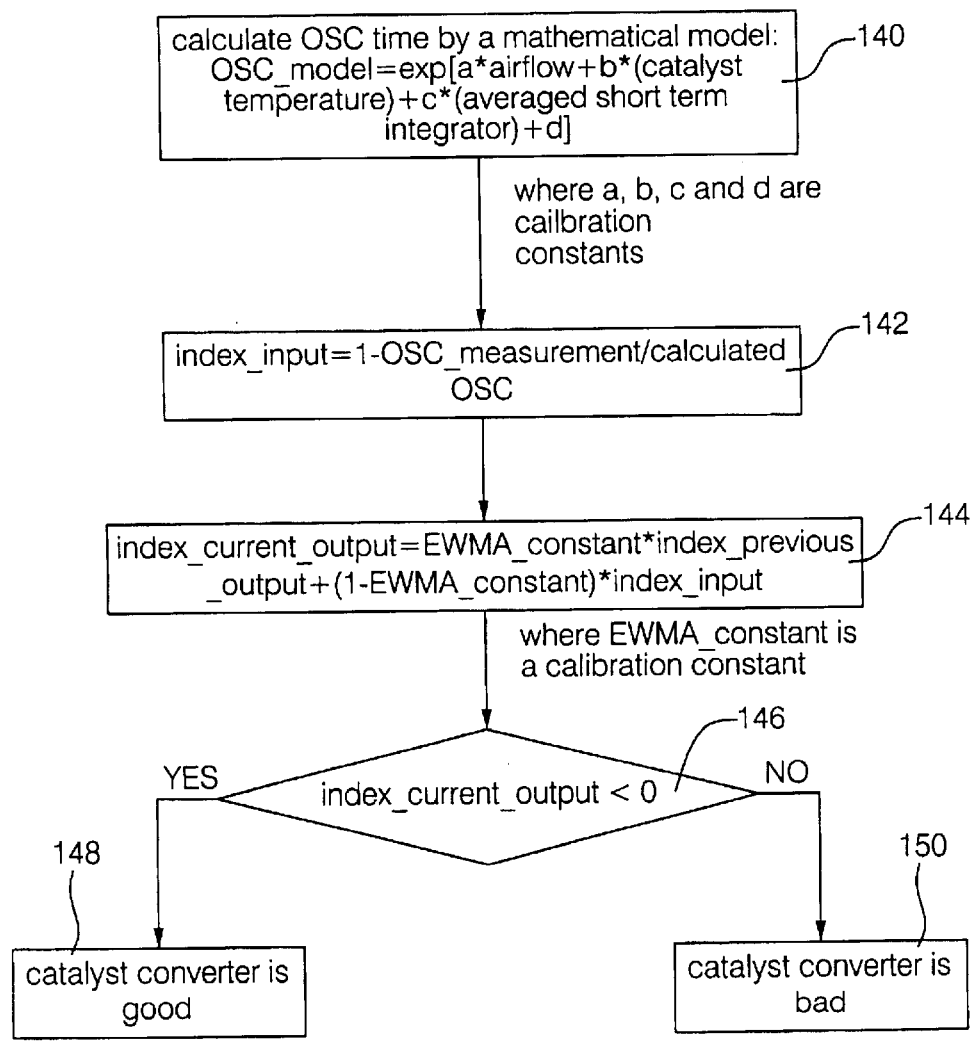
Figure 5:
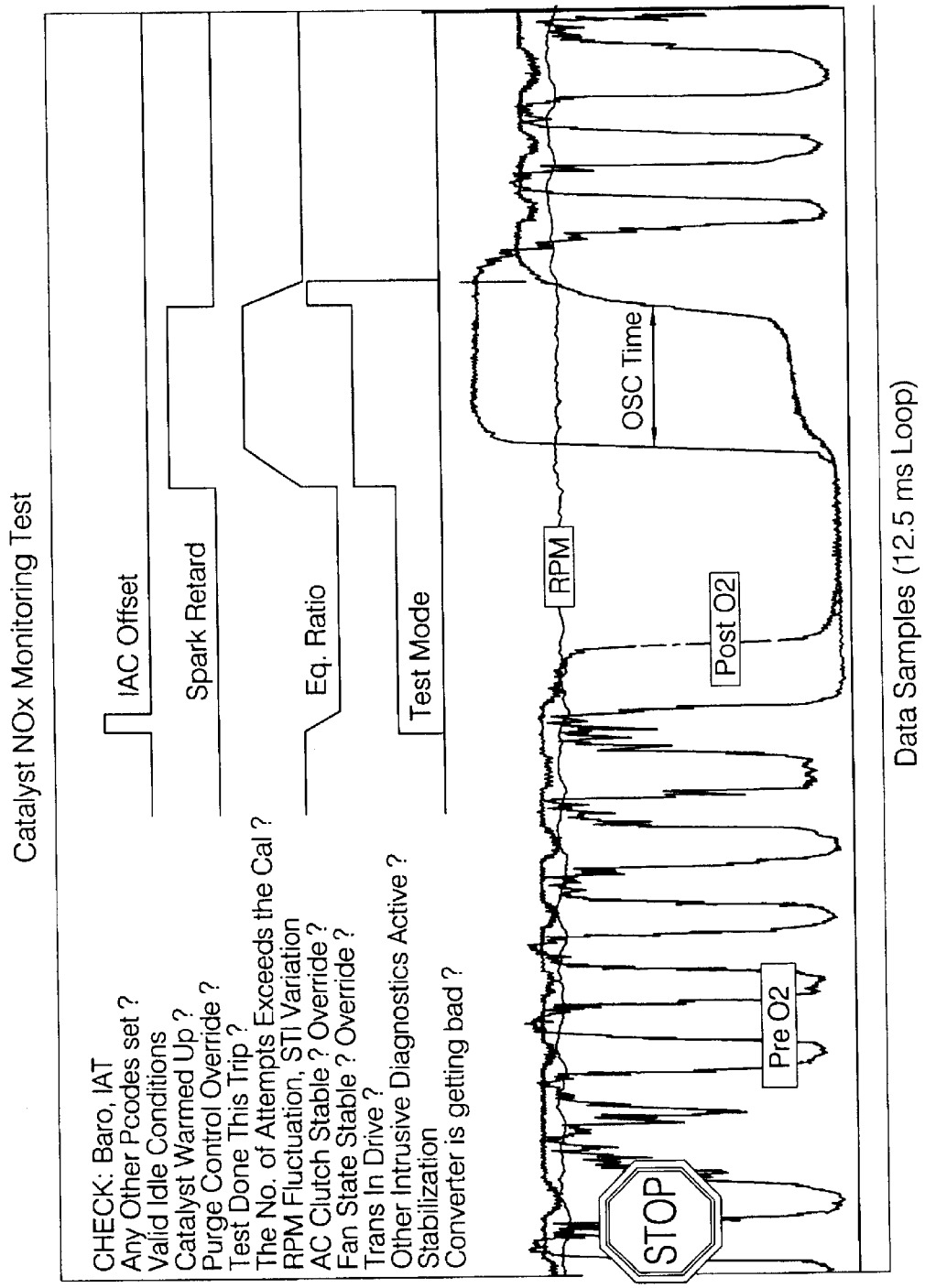
FIG. 5 is a graph illustrating a monitoring test.

Referring now to FIGS. 4A–4C, there is illustrated a process flow diagram 100 of the present invention in its simplest form. The vehicle is started and after a wait of an appropriate time period, typically 600 seconds to insure that adverse readings attributed to a cold start of the engine are not taken, the diagnostic process is begun at block 102. The diagnostic process is run during idle.

Engine stabilization occurs during block 104 and block 106 checks the enable conditions. There are many enable conditions, e.g. vehicle speed, RPM, transmission gear location, RPM variation, short term integrator variation, other related diagnostic codes, etc. After the engine starts idling the diagnostic waits a few seconds to allow the engine to stabilize. In the meantime the diagnostic algorithm checks all relating enabling conditions.

A decision node 110 determines whether the enable conditions have been met. If not, block 112 stops the process. If on the other hand, the conditions are met block 114 performs purge canister intrusive control. Purge canister intrusive control has two scenarios: either close the canister purge or freeze the canister purge at where it is. What this does is to make the fuel control system operating under one steady state condition and yields consistent OSC measurement.

Then the algorithm estimates the stoichiometric point of the fuel control. The algorithm learns the stoichiometric point of the fuel control by averaging the short term integrator during the system learning time period. The algorithm then takes over the fuel control authority and performs open loop control.

Open loop control is a control configuration in which the control module (or controller) has no feedback information from the output of the system and therefore the control input to the system is not adjusted by the system output.

Closed loop control is a different control configuration in which the controller takes the feedback information from the system output and uses the information to adjust the control input to the system.

Block 116 conducts fuel system adaptive learning. Block 118 forces the fuel control from a closed loop to an open loop control and block 120 commands the air to fuel ratio offset to lean. Block 122 modifies spark and/or idle air control to maintain the engine RPM performance for diagnostic.

This is used to determine the OSC time. It first forces the system to go lean (e.g. 6%) and wait for three seconds (adjustable) to saturate the converter, it then forces the system to go rich (e.g. 10%) and measures the time delay between the pre-O2 switch and post O2 switch. Of course, and as applications may require, the aforementioned air to fuel ratios may vary. This time delay is referred to as the OSC time. After the measurement is processed, the diagnostic algorithm releases its control authority and the system reverts back to the normal closed loop mode. The OSC time is then used to monitor the conversion efficiencies of the vehicle catalytic converter.

A decision node 124 determines whether the sensor reading of post O2 sensor 52 is less than a calibratible level. If not, step 126 instructs the system to wait. Alternatively, if the reading of post O2 sensor 52 is less than the calibratible level block 128 begins a saturation time counter. A decision node 130 determines whether the saturation time is greater than or equal to a calibratible limit. If not, a step 132 instructs the system to wait. If the saturation time is greater than or equal to the limit a step 134 commands the air to fuel ratio offset to the opposite of block 120 (e.g. rich).

Block 136 controls spark and or air control to maintain engine RPM performance. Block 138 performs the oxygen storage capacity (OSC) measurement. Block 140 calculates the OSC time by a mathematical model namely, the model:

$$OSC = e^{a^*air\_flow + b^*catalyst\_temperature + c^*averaged\_short\_term\_integrator + d}$$

derived in U.S. patent application Ser. No. 09/794,607 is used here.

Block 142 sets index_input=1-OSC_measurement/calculated OSC.

Block 144 performs the following functions where EWMA_constant is a calibration constant:

index_current_output=$EWMA$_constant*index_previous_output+(1-$EWMA$_constant)*index_input A decision node 146 determines whether index_current_ <0. If yes, block 148 determines that the catalyst converter is good or alternatively block 150 determines that the catalyst converter is bad.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for measuring the oxygen storage capacity of a catalytic converter on board a vehicle, comprising:
    calculating an average Fuel Short Term Integrator (STI);
    holding the value of said average Fuel Short Term Integrator (STI) in a fuel control subsystem throughout a measuring period of said oxygen storage capacity;
    ramping an air/fuel ratio of an engine of said vehicle during said measuring period;
    adjusting spark, air and fuel mixtures to said engine during said measuring period;
    forcing said catalytic converter into a stable saturated state, said stable saturated state corresponding to a lean air to fuel ratio;
    changing said saturated state to a rich air to fuel ratio;
    measuring the time delay between a first oxygen sensor reaching a predetermined value corresponding to said first oxygen sensor and a second oxygen sensor reaching a predetermined value corresponding to said second oxygen sensor, said first oxygen sensor being positioned at the inlet of said catalytic converter and said second oxygen sensor being positioned at an outlet of said catalytic converter, said time delay corresponding to the oxygen storage capacity of said catalytic converter.

2. The method as in claim 1, wherein said catalytic converter is forced into said stabilized state for at least three seconds before changing to proceeding to said rich air to fuel ratio.

3. The method as in claim 1, wherein said threshold value is a modeled oxygen storage capacity value.

4. The method as in claim 1, wherein the saturation of said catalytic converter is performed after a post-O2 sensor voltage is below a calibrated value corresponding to a lean stage.

5. The method as in claim 4, wherein said air to fuel ratio is maintained rich or lean for a fixed duration of time during said measuring period to get consistent saturation of said catalytic converter from each measuring period.

6. The method as in claim 1, wherein said air to fuel ratio is maintained rich or lean for a fixed duration of time during said measuring period to get consistent saturation of said catalytic converter from each measuring period.

7. The method as in claim 1, wherein said catalytic converter is diagnosed by a control algorithm of an engine control module of a vehicle.

8. A catalytic converter monitor apparatus, comprising:
    a first oxygen sensor mounted in a vehicle exhaust system upstream of a catalytic converter catalyst;
    a second oxygen sensor mounted in the vehicle exhaust system downstream of at least a portion of the catalytic converter catalyst; and
    an electronic controller coupled to said first and second oxygen sensors and to a vehicle engine, said vehicle engine provides an input signal indicative of an engine operating condition to the electronic controller, said electronic controller further comprising:
        a control algorithm, said control algorithm determining an oxygen storage capacity of said catalytic converter; and
        an adaptive table modifier, for updating a table as said catalytic converter ages;
    wherein said control algorithm forces said catalytic converter into a stable saturated state, said stable saturated state corresponding to a lean air to fuel ratio after a predetermined time, said control algorithm further forcing said catalytic converter into a rich air to fuel ratio and measuring the time delay between said first oxygen sensor and said second oxygen sensor, said first oxygen sensor being positioned at the inlet of said catalytic converter and said second oxygen sensor being positioned at an outlet of said catalytic converter, said time delay corresponding to the oxygen storage capacity of said catalytic converter, said algorithm further normalizing the oxygen storage capacity to define a normalized oxygen storage capacity value and the normalized oxygen storage capacity value is compared to a threshold value, said threshold value indicating a properly operating catalytic converter.

9. The method as in claim 8, wherein said catalytic converter is forced into said stabilized state for at least three seconds before changing to proceeding to said rich air to fuel ratio.

10. A method for measuring the oxygen storage capacity of a catalytic converter, comprising:

stabilizing an engine of a vehicle;

capturing catalyst operating state data;

setting proportional fuel control to zero;

forcing said catalytic converter into a stable saturated state, said stable saturated state corresponding to a lean air to fuel ratio;

changing said saturated state to a rich air to fuel ratio;

measuring the time delay between a first oxygen sensor and a second oxygen sensor, said time delay corresponding to the oxygen storage capacity of said catalytic converter, said first oxygen sensor being positioned at the inlet of said catalytic converter and said second oxygen sensor being positioned at an outlet of said catalytic converter;

normalizing the oxygen storage capacity to define a normalized oxygen storage capacity value; and comparing said normalized oxygen storage capacity value to a threshold value.

11. The method as in claim 10, wherein said lean to air to fuel ratio is approximately six percent.

12. The method as in claim 11, wherein said rich to air fuel ratio is approximately ten percent.

13. The method as in claim 10, wherein said rich to air fuel ratio is approximately ten percent.

14. A method for measuring the oxygen storage capacity of a catalytic converter in a vehicle, comprising:

stabilizing an engine of a vehicle;

checking enabling conditions of said vehicle;

determining whether enabling conditions are met;

forcing the fuel control of said vehicle from a closed loop to an opening loop control;

setting a proportional fuel control to zero;

forcing said catalytic converter into a stable saturated state, said stable saturated state corresponding to a lean air to fuel ratio;

changing said saturated state to a rich air to fuel ratio;

measuring the time delay between a first oxygen sensor and a second oxygen sensor, said time delay corresponding to the oxygen storage capacity of said catalytic converter, said first oxygen sensor being positioned at the inlet of said catalytic converter and said second oxygen sensor being positioned at an outlet of said catalytic converter;

normalizing the oxygen storage capacity to define a normalized oxygen storage capacity value; and comparing said normalized oxygen storage capacity value to a threshold value.

15. The method as in claim 14, wherein said method is performed by a control algorithm in an engine control module in said vehicle.

16. The method as in claim 15, wherein said threshold value is determined by a statistical modeling approach.

* * * * *